(12) United States Patent
Bouru et al.

(10) Patent No.: US 8,591,173 B2
(45) Date of Patent: Nov. 26, 2013

(54) SYSTEM FOR CONTROLLING VARIABLE GEOMETRY APPARATUSES IN A TURBINE ENGINE

(75) Inventors: Michel Andre Bouru, Montereau sur le Jard (FR); Bruno Robert Gaully, Marolles en Hurepoix (FR)

(73) Assignee: Snecma, Paris (FR)

( * ) Notice: Subject to any disclaimer, the term of this patent is extended or adjusted under 35 U.S.C. 154(b) by 434 days.

(21) Appl. No.: 13/121,700

(22) PCT Filed: Sep. 23, 2009

(86) PCT No.: PCT/FR2009/051791
§ 371 (c)(1),
(2), (4) Date: Mar. 30, 2011

(87) PCT Pub. No.: WO2010/037949
PCT Pub. Date: Apr. 8, 2010

(65) Prior Publication Data
US 2011/0182716 A1    Jul. 28, 2011

(30) Foreign Application Priority Data

Sep. 30, 2008 (FR) ..................................... 08 56573

(51) Int. Cl.
*F04D 29/56* (2006.01)
(52) U.S. Cl.
USPC .......... 415/36; 415/149.4; 415/165; 415/191; 415/211.2; 416/47; 416/104
(58) Field of Classification Search
USPC ................. 415/36, 40, 42, 149.1, 149.4, 150, 415/153.2, 165, 191, 211.2; 416/44–47, 416/103–107, 154
See application file for complete search history.

(56) References Cited

U.S. PATENT DOCUMENTS 4,292,802 A    10/1981  Snow
4,403,912 A     9/1983  Pekari et al.
(Continued)

FOREIGN PATENT DOCUMENTS

CN         101072925 A      11/2007
EP         1 398 464         3/2004
(Continued)

OTHER PUBLICATIONS

Combined Office Action and Search Report issued Mar. 25, 2013 in Chinese Patent Application No. 200980138753.6 with English translation and English translation of categories of cited documents.

(Continued)

*Primary Examiner* — Igor Kershteyn
(74) *Attorney, Agent, or Firm* — Oblon, Spivak, McClelland, Maier & Neustadt, L.L.P.

(57) ABSTRACT

A control system for controlling at least two variable-geometry devices of a turbomachine, and a turbomachine including such a control system, the system including an actuator that actuates both devices; one of the devices including at least one stage of variable-pitch stator vanes, and the other device being an air-bleed valve for a turbomachine body. The system is configured to control progression opening of the vane stage and progressive closing of the air-bleed valve as an actuation parameter of the actuator increases. As a result, the control system serves advantageously to control two devices using a single control system.

13 Claims, 7 Drawing Sheets

(56) References Cited

U.S. PATENT DOCUMENTS

| | | | |
|---|---|---|---|
| 4,992,946 A | | 2/1991 | Butz et al. |
| 8,328,500 B2 * | | 12/2012 | Colotte et al. ............ 415/36 |
| 8,333,546 B2 * | | 12/2012 | Colotte et al. ............ 415/36 |
| 8,337,140 B2 * | | 12/2012 | Colotte et al. ............ 415/36 |
| 2004/0050071 A1 | | 3/2004 | Bachelder et al. |
| 2006/0263206 A1 | | 11/2006 | Bouru |
| 2008/0028764 A1 | | 2/2008 | Cadieux |

FOREIGN PATENT DOCUMENTS

| | | |
|---|---|---|
| EP | 1 724 472 | 11/2006 |
| FR | 2 445 439 | 7/1980 |
| FR | 2 633 046 | 12/1989 |
| WO | 2007 116319 | 10/2007 |

OTHER PUBLICATIONS

Office Action for corresponding Russian Application No. 2011117534 dated May 6, 2013.

International Search Report Issued Mar. 10, 2010 in PCT/FR09/051791 filed Sep. 23, 2009.

U.S. Appl. No. 13/379,869, filed Dec. 21, 2011, Gaully, et al.

* cited by examiner

SYSTEM FOR CONTROLLING VARIABLE GEOMETRY APPARATUSES IN A TURBINE ENGINE

The present invention relates to the general field of controlling variable-geometry devices in a turbomachine. More particularly, the invention seeks to optimize the control of a plurality of turbomachine devices.

The term "variable-geometry device" is used herein to mean any device that includes a control member of size, shape, position, and/or speed that is or are capable of being modified as a function of detected events or as a function of turbomachine speeds in order to act on the operation of the turbomachine. Examples of variable geometries in such devices include the positions of air-bleed valves of a compressor, clearances at the tips of turbine blades, speeds of a fuel pump, etc.

The term "body" is used herein to mean a turbomachine subassembly comprising as main members both a compressor and a turbine that are assembled on a common shaft. A special case of such a body is the post-combustion body in which the compressor is made up solely by a converging nozzle, as is used in ramjets. A typical example of distinct bodies of a turbomachine is constituted by the low- and high-pressure spools of a turbojet.

In general, turbomachine spools are designed to be capable of operating independently of one another. Their speeds of rotation are independent, even if they might be linked or correlated under certain operating speeds.

Also conventionally, because of this independence between the various spools of a turbomachine, in order to control variable-geometry devices associated with different spools, provision is made for those devices to be controlled by respective distinct control systems. That is why controlling two variable-geometry devices associated with two distinct spools thus generally requires two control circuits, two actuators, two power sources, etc.

This gives rise to the weight, cost, and size of such a control system being relatively large. This gives rise in particular to problems on turbomachines that are fitted to small airplanes, where these problems are particularly acute.

A first object of the invention is thus to define a control system for controlling at least two variable-geometry devices in a turbomachine, the system comprising an actuator that actuates the two devices, comprising a device having at least one stage of variable-pitch stator vanes and a device is or at least comprises an air-bleed valve for a body of the turbomachine; the control system remedying the above-mentioned problems of waste, cost, and size, at least in part.

This object is achieved by the fact that the control system is arranged to control progressive opening of the vane stage and progressive closing of the air-bleed valves as an actuation parameter of the actuator increases.

In an embodiment, the control system is suitable for controlling three or even four variable-geometry devices using a single actuator.

In an embodiment, a variable-geometry device is common to a plurality of turbomachine spools, in particular common to two spools.

By using only one actuator for controlling a plurality (at least two) of variable-geometry devices, the control system serves to reduce the number of parts in the turbomachine and thus to achieve the object of the invention. The weight, the volume, and the cost of a second control system for the second variable-geometry device are avoided, at least to a large extent.

The invention is suitable for being implemented in particular in a two-spool turbomachine, i.e. having a high-pressure spool and a low-pressure spool. The variable-pitch vane stage (s) are generally part of the high-pressure spool. In this case, the first device controlled by the control system may be part of the low-pressure spool of the turbomachine, while the second controlled device, comprising the variable-pitch vane stage (s), is part of the high-pressure spool.

The variable-pitch vane stages of a high-pressure spool of a turbomachine are particularly suitable for being controlled together with a device of the low-pressure spool, when they are located on the periphery (and relatively upstream) of the high-pressure spool: thus, they are situated in the vicinity of the high-pressure spool. This proximity makes it easier to implement a common control system for the vane stages and for a variable-geometry device of the low-pressure spool.

In an embodiment, in which in the second device, the vane stage is made up of a plurality of vanes each mounted to pivot on a casing of the turbomachine, and of a control ring surrounding the casing and connected to each of the vanes of the stage via respective levers, the actuator is suitable for causing the control ring of the stage to turn by means of a driver member that is pivotally mounted on the casing.

In an embodiment, the variable-geometry device is or at least comprises at least one air-bleed valve of the turbomachine and may be a single valve or equally a set of valves for discharging or bleeding air.

In various other embodiments, the variable-geometry device that is or comprises at least one air-bleed valve is or comprises any one of the following elements or an element of one of the following devices:

a booster variable bleed valve (VBV);

a transient bleed valve (TBV) or a start bleed valve (SBV) for bleeding air from a high-pressure compressor and presenting proportional opening;

a handling bleed valve (HBV) for bleeding air from a high-pressure compressor on an on/off basis; and a low-pressure turbine active clearance control (LPTACC) or a high-pressure turbine active clearance control (HP-TACC) valve for regulating a flow of air that contributes to controlling clearance.

In addition, a control system of the invention may in particular include the various following improvements:

In an embodiment, in the control system, the actuator includes a movable control member performing movements that transmit commands to both devices. The control member may for instance be the arm of an actuator.

In a variant of this embodiment, the actuator is arranged to actuate a first of said devices by varying a parameter over an actuation range for the first device outside which it cannot act on the first device, the actuator being arranged to actuate the second device by causing the same parameter to vary over an actuation range for the second device, outside which it cannot act on the second device, at least a fraction of the first device actuation range lying outside the second device actuation range.

The above-described actuator parameter is generally the position parameter of the actuation member of the actuator. For example, this parameter is the position of the end of the arm of an actuator. Causing this parameter to vary is equivalent to moving the end of the actuator or moving the position of the operating end of the actuator.

In this control system, using a single actuator to control two variable-geometry devices is made easier by the fact that the actuation ranges of the two devices do not correspond, with the actuation range of one of them (the first device) including a portion that does not form a portion of the range of the other (the second device).

The operation of the control system is normally designed so that for each of the devices, variations in the actuator parameter between the bounds of the actuation range of the device suffice for actuating that device over said range through a sufficient amplitude.

Furthermore, when the actuator parameter varies over a range that lies outside the actuation range of one of the devices, that device is not actuated by the actuator. Such a range of values for the actuator parameter, in which no action is effectively applied to one of the devices, constitutes "lost motion". In this range, regardless of any variations in the parameter, the actuator takes no (significant) action on the device in question.

The control difficulty associated with using this control system is that each action on the actuator is or may be transmitted to one and/or the other of the devices, depending on whether or not the actuator lies in one or the other or both of their respective actuation ranges.

In particular, when the actuation parameter is caused to vary over a range that is common to both actuation ranges of both actuators, action is taken simultaneously on both devices.

For example, when the actuator parameter is caused to vary over the actuation range of the first device, if this variation also lies in the actuation range of the other device, it follows that a new command is transmitted simultaneously to both devices, given that the two commands are determined by variations of the same parameter, i.e. the actuation parameter.

This difficulty of using the control system of the invention can nevertheless be considered as being acceptable and is sometimes negligible or even non-existent, when the overlap between the actuation ranges of the two devices is sufficiently small, and/or when the amplitude of the control variation for at least one of the devices can remain small or limited while the actuation parameter varies over the entire actuation range of the other device.

Thus, in spite of this difficulty in use, the saving achieved by the possibility of controlling two variable-geometry devices simultaneously in a turbomachine without suffering from the weight, the size, and the cost of having two control systems is of advantage.

The difficulty of using this control system may also be minimized by selecting an appropriate embodiment.

In one embodiment, the actuation range of the second device is included within the actuation range of the first device. This provision makes it possible to have a large actuation amplitude for the first device, thereby facilitating mechanical implementation thereof and limiting the mechanical stresses received by the control members and/or the controlled elements.

In an embodiment, the actuation range of the second device has an amplitude that is less than 20%, or less than 10% of the total amplitude of the actuation range of the first device. The amplitude of the actuation range of the second device is thus reduced. As a result, when the range of the second device is included within the range of the first device, control actions for the second device give rise only to little variation in the control of the first device that is hardly perceptible. This provision makes it easier to use a single control system for controlling two controlled devices. The control of the first device then remains substantially constant, or at least its variation remains small or marginal, while the second device is being controlled over the full control amplitude provided for that device.

In an embodiment, the connection between the actuator and one of the devices includes a declutching device, that is suitable for declutching the drive to said device by the actuator over a range of values of the actuation parameter. This range of parameters thus lies outside the actuation range for the device in question. Thus, the declutching device serves to reserve part of the actuation range for controlling only one or more devices other than the device under consideration. This can be essential when the device under consideration must not be affected even though the control applied to one of the other devices varies.

In a variant of this embodiment, the declutching device comprises a first control member that is movable in an empty space of a second control member, this space thus providing lost motion for the second device. In the lost motion provided by means of this movable control member, it is possible to control the first device freely without that control having any effect on the second device.

In an embodiment, the control system includes an actuation scaling device arranged in the connection between the actuator and one of the devices. Thus, even with an actuation range for this device that is of small amplitude, it is possible to control the device through a large amplitude as a result of the scaling provided by the actuation scaling device. An example of such a scaling device is a lever.

In an embodiment, the control system also includes return means for maintaining a control member for one of the devices in a predetermined position, at least while the actuator parameter is varying over a range situated outside the actuation range for the device.

A second object of the invention is to define a turbomachine fitted with a control system including an actuator suitable for controlling two variable-geometry devices of a turbomachine, said device forming parts of two different bodies, and presenting weight, cost, and/or size that are small.

This object is achieved by the fact that the turbomachine is fitted with a control system as defined above.

The invention can be well understood and its advantages appear better on reading the following detailed description of embodiments shown by way of non-limiting examples. The description refers to the accompanying drawings, in which.

With reference to FIGS. 1 to 4, an embodiment of a control system 1 of the invention is described below.

The control system 1 serves to control both the turning of a control ring 22 for controlling a stage 10 of variable pitch vanes (first device 10), and the movement of a control member 115 for a second device 110.

The second variable-geometry device 110 may be of various types, for example it may be an air-bleed valve of the turbomachine.

By way of example, the variable-pitch vane stage 10 forms part of a turbomachine compressor. The compressor comprises an annular stator shroud 12 (or casing) that is centered on the axis X-X of the turbomachine.

The stage 10 comprises a plurality of vanes 14 disposed radially around the axis X-X of the turbomachine. Each of the vanes 14 is pivotal about a pin 16 (or pivot) that passes through the casing 12.

Each pivot 16 of the variable-pitch vanes 14 is connected to one end of a control lever or link 18 having its other end hinged about pegs 19 extending radially on the control ring 22.

The control ring 22 surrounds the casing 12 and is centered on the axis X-X of the turbomachine. The angular positions of the vanes 14 are thus modified synchronously by turning the control ring 22 about the axis X-X of the turbomachine.

In addition, the control system includes a cylinder-type actuator 24 that is fastened to the casing 12 in order to drive turning of the control ring 22 of the stage 10 via a crank-type driver member 26 that is pivotally mounted on a unit 28 of the turbomachine casing 12.

Figure 1:
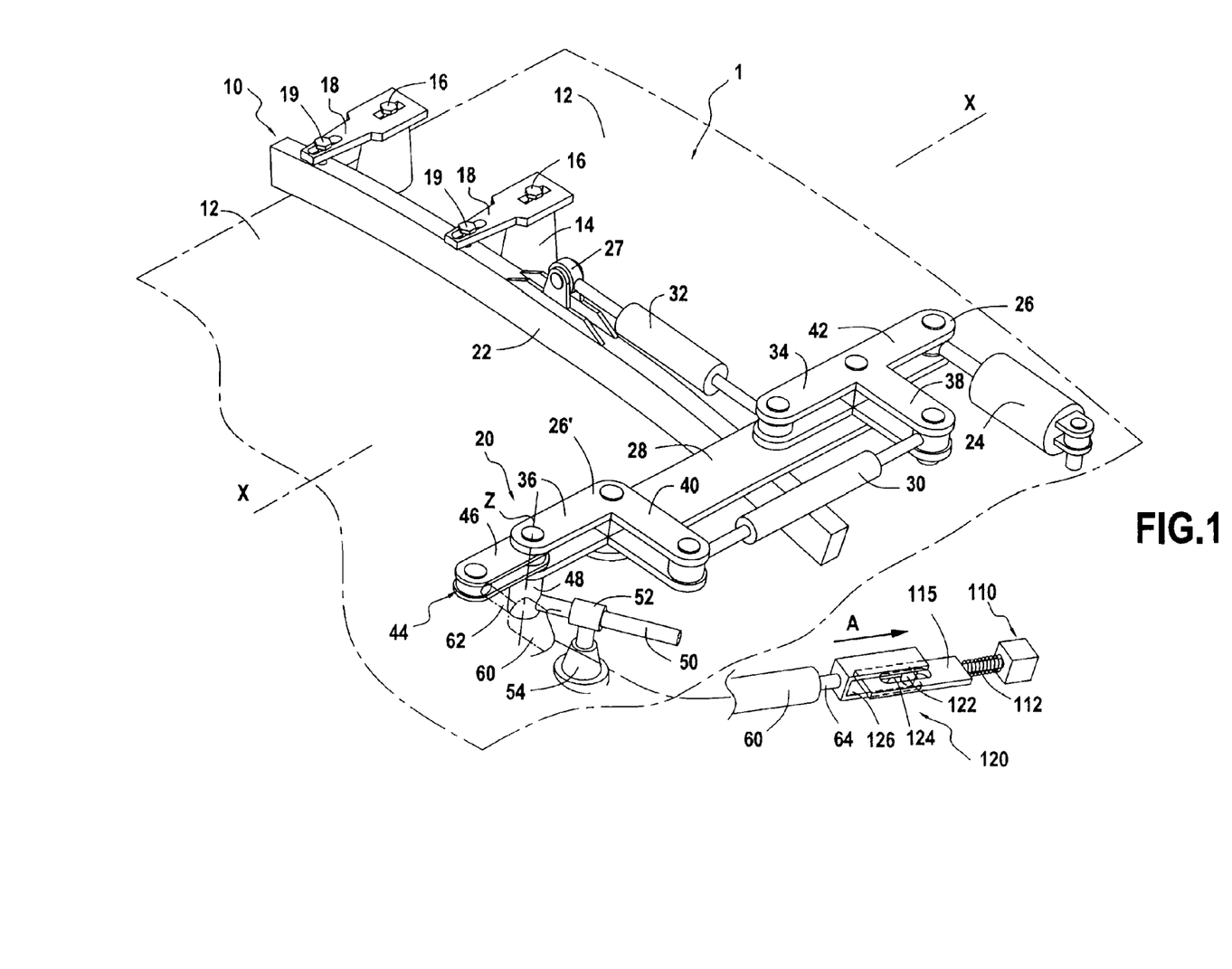
FIG. 1 is a perspective view of a control system of the invention.
Figure 2:
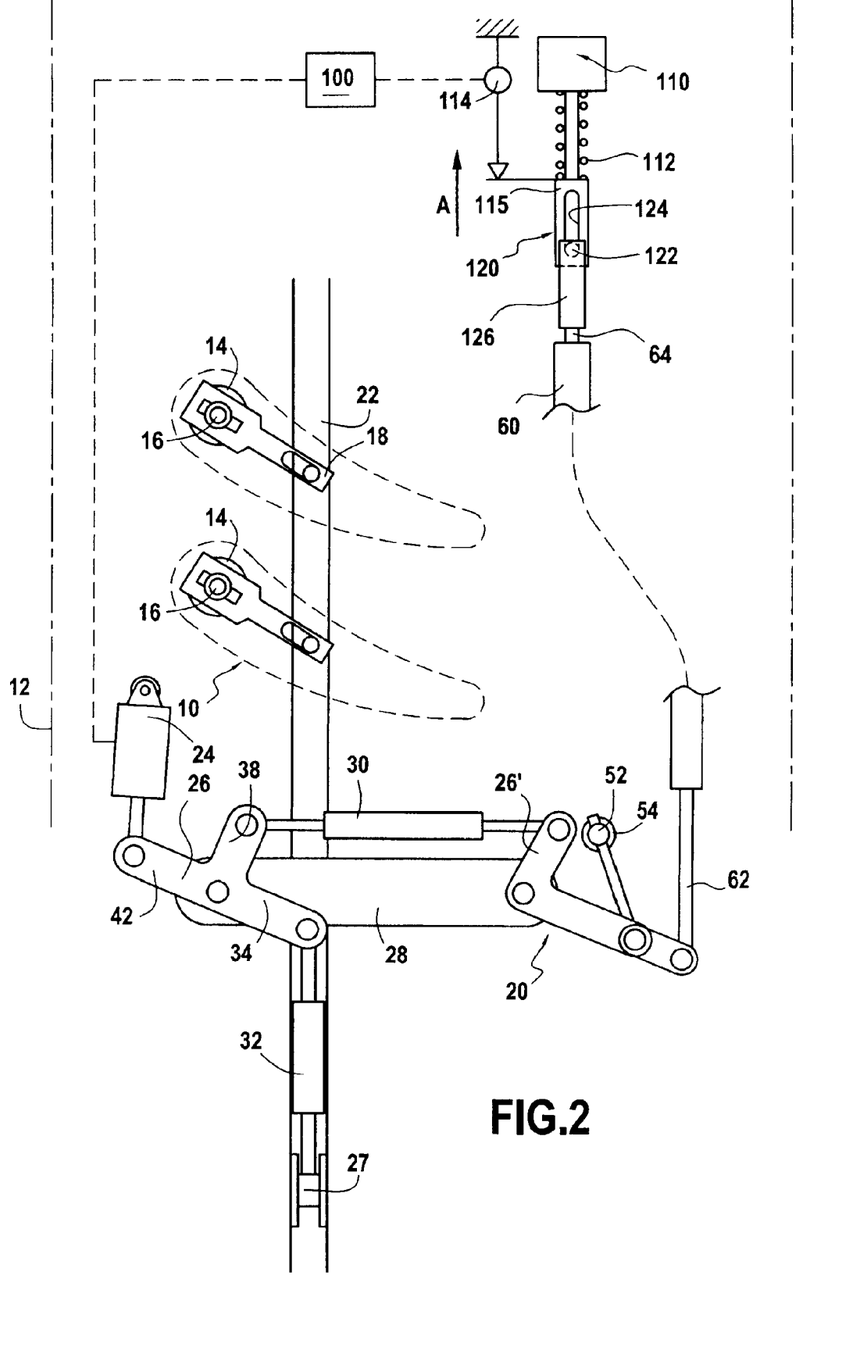
FIGS. 2, 3, and 4 are plan views of the FIG. 1 system shown respectively in minimum, intermediate, and maximum extension positions of the actuator.
Figure 3:
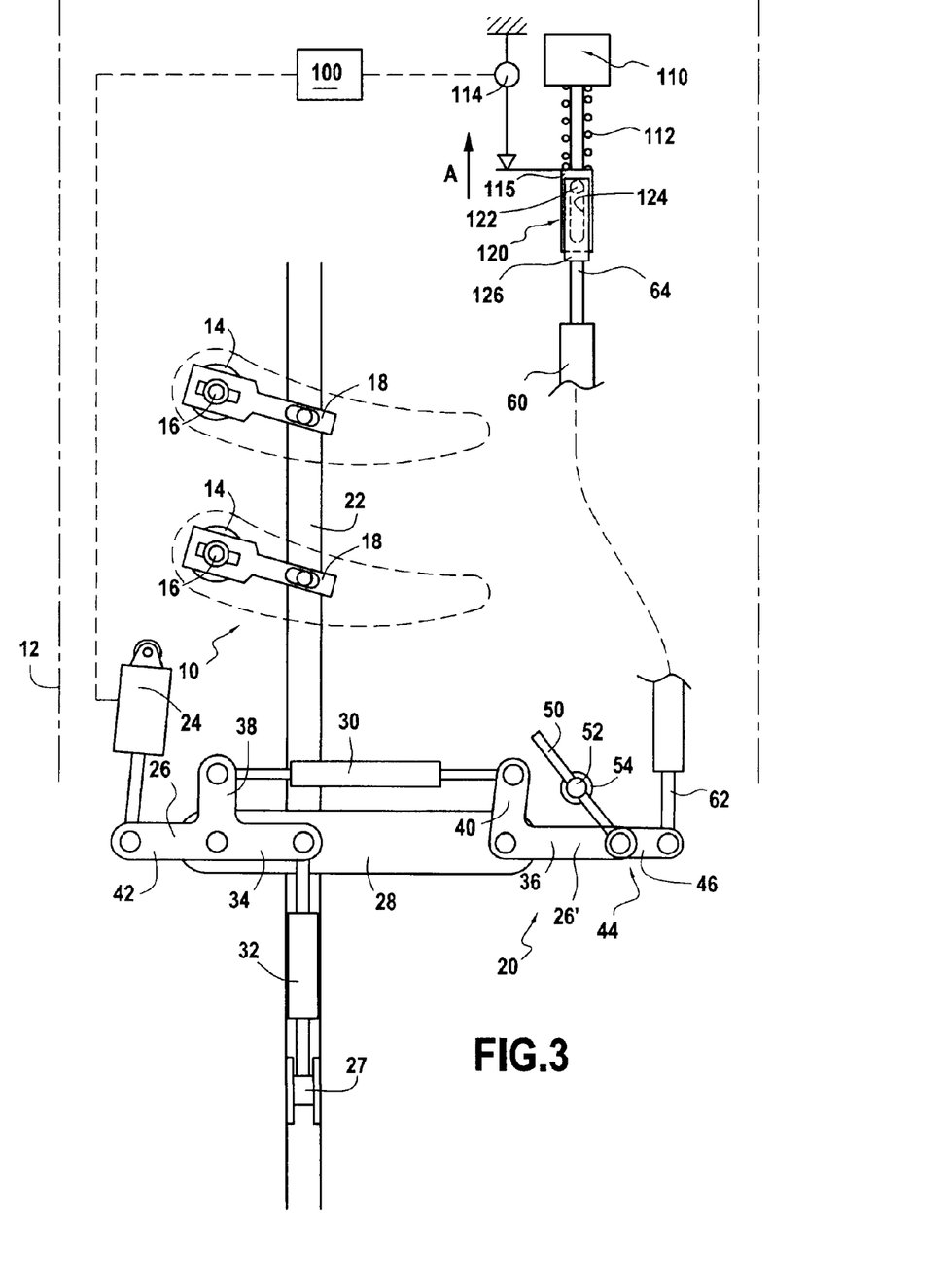
Figure 4:
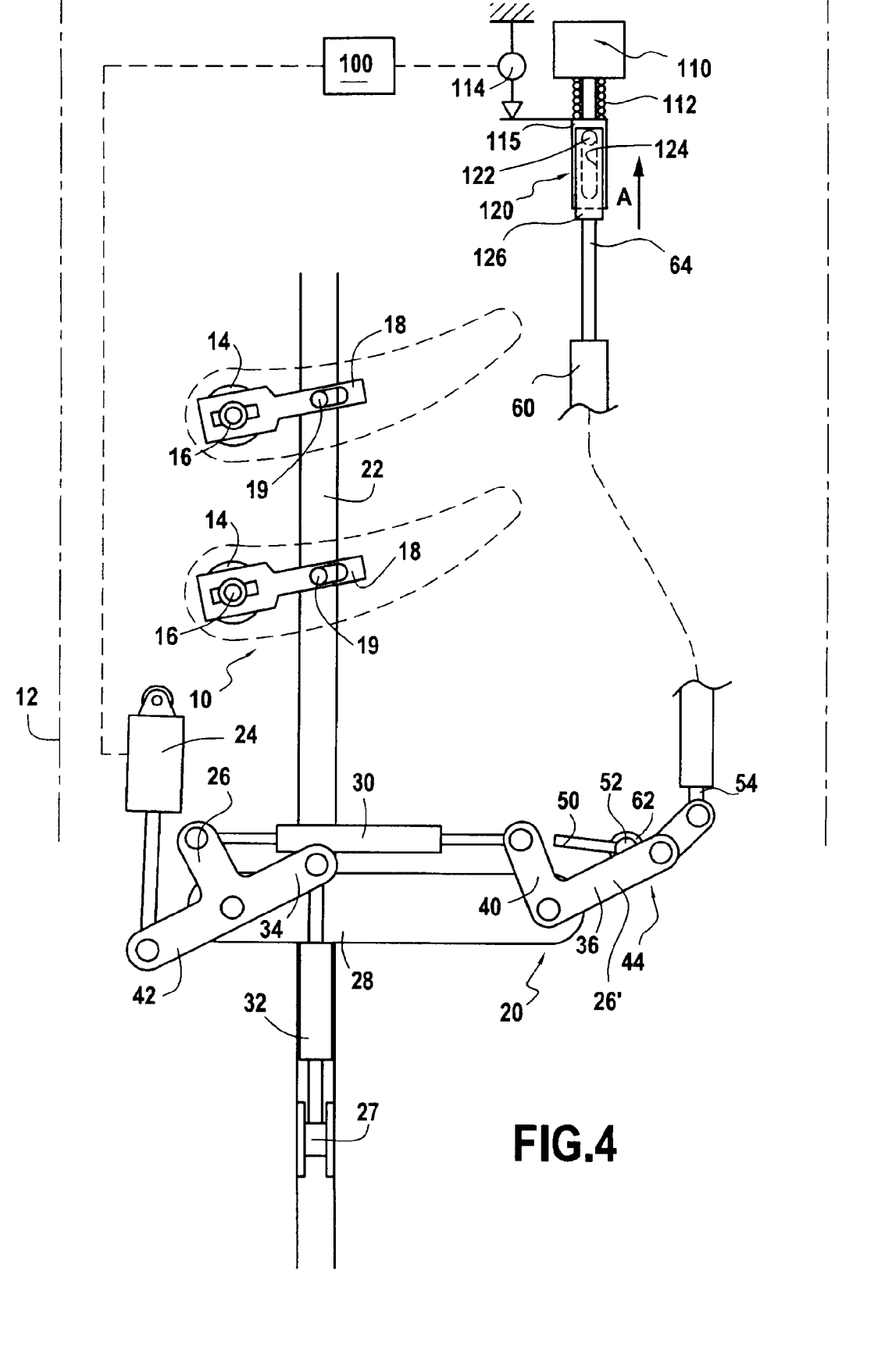

The actuator 24 is controlled by an electronic control unit 100 (shown in FIGS. 2 to 4).

A control connecting rod 32 of the turnbuckle type transmits movement from the driver crank 26 to the ring 22. This connecting rod extends tangentially to the ring 22 to which it is fastened via a connection fork 27. At its end opposite from the fork 27, the connecting rod 32 is fastened to one of the arms (or branches) 34 of the driver crank 26, being hinged thereto.

The crank 26 and the connecting rod 32 constitute the actuation transmission system from the actuator 24 to the control ring 22.

The command is transmitted to the second controlled device 110 initially via a synchronizing bar 30.

The synchronizing bar 30 transmits the movement of the actuator 24 to the second device 110 via a crank type follower member 26' likewise pivotally mounted on the unit 28 of the casing 12.

Thus, the synchronizing bar 30 of the control system unites two respective arms 38 and 40 of the driver and follower cranks 26 and 26' by being hinged thereto. The actuator 24 is hinged to a third arm 42 of the driver crank 26, opposite from the arm 34 to which the connecting rod 32 is fastened.

Furthermore, the control system shown in FIGS. 1 to 4 includes an actuation scaling device 20 (not essential for the invention), which is interposed in the connection between the actuator 24 and the variable-geometry device 110.

This device comprises in particular an additional pivot member 44 (or additional crank) interposed between the follower member 26' and the variable-geometry device 110. This additional crank 44 is pivotally mounted both on the follower member 26', and indirectly on the casing 12 via a guide rod 50 and a pivoting support 54.

This additional crank 44 has an arm 46 with a first end connected to one end 62 of a control cable 60 of the variable-geometry device 110, being hinged thereto, and having its second end pivotally mounted to the end of an arm 36 of the follower crank 26'. At this second end of the arm 46, the additional crank 44 also includes a pivot pin 48 extending perpendicularly to the first arm 46 along a pivot axis Z of the additional crank 44 on the follower member 26'. The guide rod 50 passes through this pivot pin 48. It is slidably mounted in a sliding ring 52 that is pivotally mounted on the casing 12 via a pivoting support 54 that is brazed to the casing.

The connection between the actuation scaling device 20 and the variable-geometry device 110 takes place remotely, i.e. via a push-pull cable 60 (e.g. of the "Bowden" cable type) and a sliding junction member 120.

Drive from the actuator 24 as transmitted via the crank 26, the synchronizing bar 30, the follower crank 26', and then amplified by the actuation scaling device (the operation of this device is described below), is transmitted to the push-pull control cable 60.

The end 64 of the control cable 60 is connected to the middle portion of a U-shaped yoke 126. The two branches of the yoke 126 pass on either side of a control member 115 of the variable-geometry device 110, serving to control movements of the device 110 along the direction shown by arrow A. This control member 115 is in the form of a rectangular plate pierced by an oblong hole 124. The two branches of the yoke 126 are connected together by a rod 122 that passes through the oblong hole 124.

The yoke 126 and the rod 122 sliding in the elongate hole 124 constitute the sliding junction member 120. The actuator 24 drives the second device 110 via this sliding junction member 120, with the sliding thereof defining a certain amount of lost motion. So long as the rod 122 is moving inside the elongate hole 124 without coming into abutment with one of the ends thereof, then there is no movement of the control member 115, or in other words the movements of the actuator 24 do not give rise to any movement of the control member 115 for the device 110.

It should be observed that in another embodiment (not shown), the end 62 of the control cable 60 could be directly connected to the end of the arm 36 of the follower crank 26' (FIG. 1), thereby enabling a stroke to be obtained that is identical to that of the first control device 10 (the control ring 22 of the stage 10 of variable-pitch vanes). Such an embodiment would be appropriate when the control of the second device does not require any scaling of the actuation stroke.

In order to understand the operation of the control system 1, FIGS. 2 to 4 show the movement of the system in three positions, corresponding to minimum extension, intermediate extension, and maximum extension positions of the actuator 24. In the control system 1, the extension of the invention 24 constitutes the actuation parameter of the actuator.

By way of example, FIG. 2 shows the beginning of action on the devices. In an initial situation (FIG. 2), the actuator is in its minimum extension position; the variable-pitch vanes 14 are in their open position.

Starting from this position, actuating the actuator 24 causes the driver crank 26 to turn, and also causes the follower crank 26' to turn under drive from the synchronizing bar 30. The turning of the crank 26 about its pivot point on the unit 28 serves in turn to drive the connecting rod 32 that then causes the ring 22 to turn in one direction or the other about the axis X-X of the turbomachine. As mentioned above, turning the ring 22 causes the angular position of the vanes 14 of the stage 10 to be modified synchronously by means of the control levers 18.

Furthermore, turning the crank 26' causes the initial crank 44 to turn through an angle that is scaled relative to the angle through which the crank 26' turns. Angle scaling is associated with the fact that the pivoting of the follower crank 26' causes the pivot pin (arm 48) of the additional crank 44 to pass very close to the pivot point on the casing (pivoting support 54). Under such circumstances, a very small amount of turning of the follower crank 26' gives rise to a relatively large amount of turning of the additional crank 44.

Turning of the additional crank 44 drives the control cable 60 in sliding in its sheath, and thus drives the yoke 126, which cable and yoke are pushed back by the arm 46 of the additional crank 44.

FIG. 3 corresponds to a specific position during extension of the actuator 24.

When the actuator 24 extends, the control cable 60 pushes back the yoke 126 together with the rod 122 in the oblong hole 124 in the direction of arrow A. The position shown in FIG. 3 is specific in that it corresponds to the particular moment when the rod 122 secured to the yoke 126 comes into abutment against the hole 124 in the direction of arrow A (which is the actuation direction for the control member 115), from which position the rod 122 begins to drive the control member (plate 115) of the variable-geometry device 110. Conversely, from the beginning of extension of the actuator 24, and up to this position, the control member 115 is not moved from its initial position (FIG. 2) in spite of the movement of the yoke 126. Thus, the actuation range of the actuator 24 between its initial position (FIG. 2) and the specific intermediate position of FIG. 3, constitutes lost motion for the second controlled device 110.

In contrast, starting from the specific position or the beginning-of-actuation position as shown in FIG. 3, any additional extension of the actuator 24 causes the rod 122 secured to the yoke 126 to push the control member 115 back in the direction of arrow A, thereby driving it. The positions of the actuator 24 that are greater than or equal to this position constitute the actuation range for the second device 110.

It should also be observed that as soon as the actuator 54 goes beyond this beginning-of-actuation position, a spring 112 acts as return means for keeping the control member 115 permanently in contact with the rod 122. Thus, the control member 115 then follows at all instants any movements of the rod 122 in the direction of arrow A and also in the opposite direction. Conversely, in the lost motion of the sliding junction member 120, the control member 115 remains blocked in its "low" position in FIGS. 2 and 3.

Finally, the control system includes a position sensor 114 located in the vicinity of said variable-geometry device and suitable for relaying information concerning the position of the variable-geometry device 110. In the embodiment shown, the sensor 114 is designed to determine the position of the control member 115 of the variable-geometry device 110, and to relay it to the electronic control unit 100.

Figure 5:
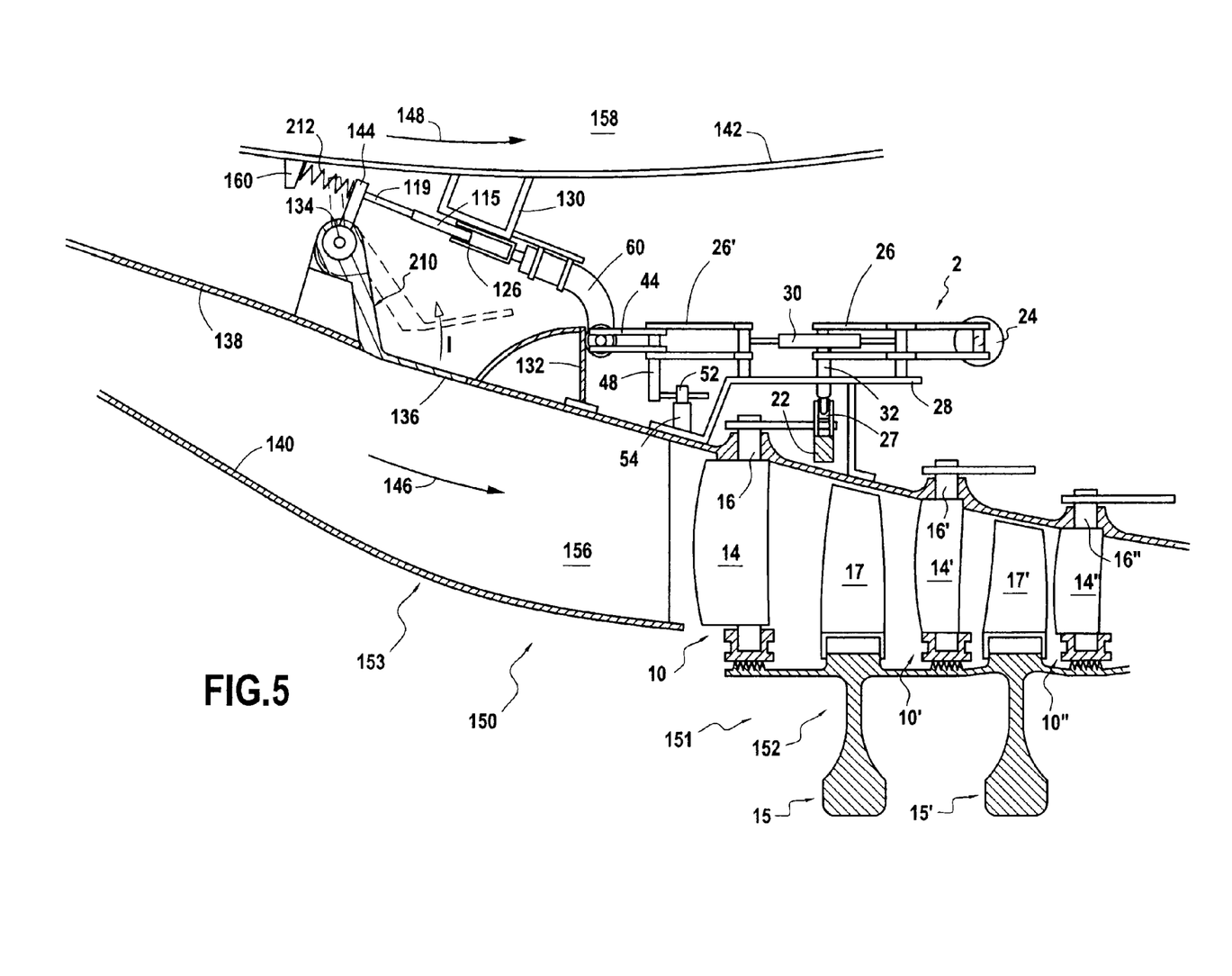
FIG. 5 is a longitudinal section view of the control system shown in FIGS. 1 to 4, for the particular circumstance in which the variable-geometry device is an air-bleed hatch for the high-pressure spool.

There follows a description of an embodiment of the control system 2 of the invention, given with reference to FIG. 5. This figure shows the particular circumstance in which the second variable-geometry device is an air-bleed system 210 including a set of air-bleed hatches 136.

This control system 2 is very similar to the system described with reference to FIGS. 1 to 4; corresponding elements retain the same numerical references.

FIG. 5 is a fragmentary section view of the turbomachine 150 which is a bypass turbojet. In the upstream portion of the turbomachine 150, the air stream ingested by the turbomachine is split into a primary stream 146 and a secondary stream 148. The primary stream constitutes the oxidizer for enabling combustion of fuel that is injected into a combustion chamber.

A first fraction of the energy released by combustion is recovered by means of a first turbine (high pressure turbine) by a first main subassembly of the turbomachine, i.e. the high-pressure spool 151. The high-pressure spool is said to be "high pressure" because prior to being injected into the combustion chamber, the gas in the primary stream is compressed to a high pressure by a compressor 152, referred to as the high-pressure compressor, a portion of which can be seen in FIG. 5.

A second fraction of the energy released by combustion is recovered by means of a second turbine in a second main subassembly of the turbomachine, i.e. the low-pressure spool 153. This low-pressure spool includes at least one stage of blades (the fan blades) that are driven to rotate so as to generate a large portion of the thrust that is delivered by the turbomachine 150 by reaction.

As a result of this design, the high- and low-pressure spools are relatively independent of each other, in particular in terms of speed of rotation. It follows that the commands that are applied to their devices may, depending on circumstances, be governed by considerations that are completely different or independent.

In known manner, and following the secondary air stream from upstream to downstream through the turbomachine, the secondary air stream is initially compressed by a low-pressure compressor, and then by the high-pressure compressor; it then passes into the combustion chamber, and then expands, passing through the high- and low-pressure turbines in succession. The high-pressure compressor is thus situated downstream from the low-pressure compressor.

The primary and second streams 146 and 148 pass through the turbomachine 150 in respective concentric annular passages 156 and 158. The passage 156 for the primary stream extends between an outer fairing 138 and an inner fairing 140. The passage 158 for the secondary stream extends between an outer fairing (not shown) constituting the inner fairing of the nacelle, and an inner fairing 142.

The control system 2 is placed between the fairings 138 and 142 lying between the primary and secondary streams.

In conventional manner, the positions of the vanes of the variable-pitch vane stages are controlled as a function of ambient pressure and of the speed of rotation of the high-pressure spool.

Furthermore, in conventional manner, the air-bleed hatches 136 are opened as a function of ambient pressure and of the air flow rate at the outlet form the low-pressure compressor. Thus, air is bled from the secondary stream downstream from the low-pressure compressor in order to change the operating speed of the compressor.

Although the usual parameters for controlling variable-pitch vane stages and air-bleed hatches are different, as outlined above, the control system 2 enables two devices to be controlled: firstly the variable-pitch vane stages 10, 10', 10"; and secondly a variable-geometry device 210 constituted by a set of air-bleed hatches 136.

The variable-pitch vane stages 10, 10', and 10" have three respective series of vanes 14, 14', and 14", suitable for pivoting about respective pivots 16, 16', and 16". Two bladed wheels 15, 15' carrying moving blades 17, 17' are interposed between the stages 10 & 10', and 10' & 10", respectively.

For reasons of simplicity, only the control of the first vane stage 10 is shown, but not the control for the other stages 10' and 10". The control of the stage is identical to that described with reference to FIGS. 1 to 4. The second controlled device is the set of air-bleed hatches 136. In the description below, only one hatch is described; nevertheless, in reality, the turbomachine has a set of identical hatches distributed all around the circumference of the turbomachine in the fairing 138, and all of them are controlled in identical manner to the hatch 136 that is described.

The hatch 136 has several functions. One of its functions, when the air ingested by the turbomachine has a large quantity of water (rain, snow, or hail), is to discharge a portion of this air from the primary stream in order to avoid the disturbances that would otherwise arise to combustion if too much water were to be included in the combustion mixture. Another function is to off-load the primary stream circuit during high levels of deceleration or at low speed. The command issued by the actuator 24 is transmitted to the hatch 136 via the push-pull cable 60, the yoke 126, and the control member 115. The push-pull cable is fastened to the fairings 138, 142 by supports 130 and 132. The support 130 also serves as means for guiding the movements of the yoke 126 and of the control member 115.

The control of the hatch 136 differs a little from the device shown in FIGS. 1 to 4 in that the return means (spring 212) are arranged differently from the spring 112 in FIGS. 1 to 4.

The hatch 136 is suitable for pivoting about a pivot axis 134 (in the direction of arrow I). In general, it is closed and it is urged towards the closed position by the spring 212. One end of the spring 212 is mounted on a support 160 secured to the fairing 142, while the other end delivers a return force to a drive arm 144 that is secured to the hatch 136, and that serves to close the hatch 136.

In order to open the hatch 136, the actuator 24 needs to be controlled to take up a position of sufficient extension to move the control member 115 of the hatch 136 (i.e. beyond the specific position described with reference to FIG. 3). From this specific position or start-of-actuation position, and beyond it, the actuator parameter 24 varies over the hatch actuation range 136. A first consequence is that this causes the vanes 14, whenever it is desired to open the hatch 136, to take up a pitch angle that corresponds to the actuator 24 being greatly contracted.

Over this actuation range, the yoke 126 moves the control member 115 of the hatch 136. The control member 115 is in the form of a plate extended by a rod 119. The end of the rod 119 bears against the drive arm 144. Movement of the control member 115 pushes the drive arm 144, thereby causing the hatch 136 to pivot and open.

The air bled from the primary stream by the hatch 136 is subsequently discharged into the secondary stream (this step is not shown in FIG. 5). This air adds to the secondary stream of air that is accelerated by the fan blades.

When the actuator is stretched or extended, i.e. when it is desired to reclose the hatch 136, the yoke 126 and the control member 115 are pulled backwards by the control cable 60. The hatch 136 then closes under the effect of the spring 212.

Figure 6:
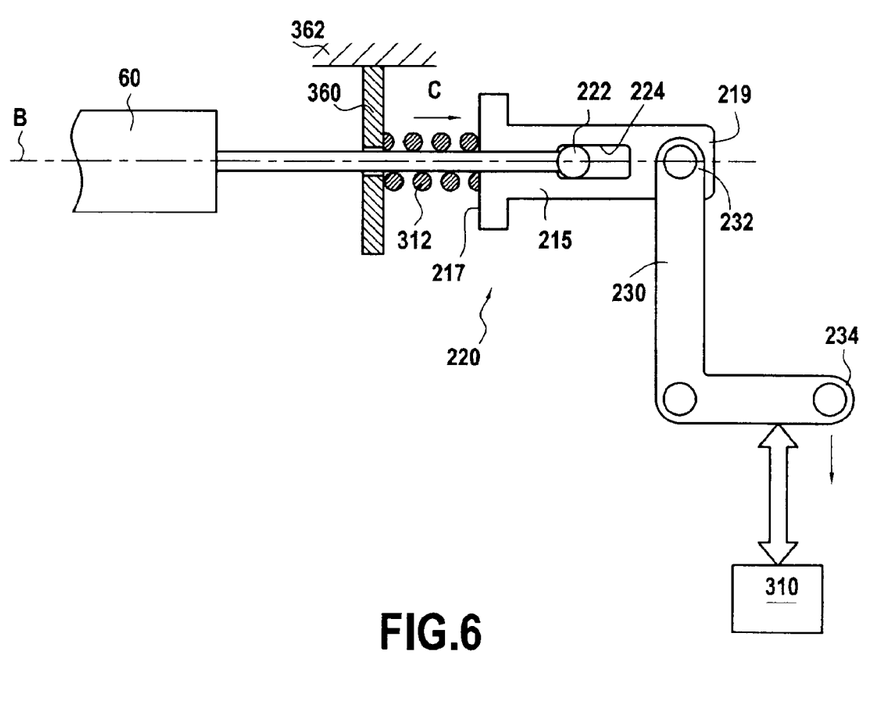
FIG. 6 shows a variant of a declutching system enabling a certain amount of "lost motion" to be provided.

FIG. 6 shows a declutching system 220 forming part of a control system for controlling two variable-geometry devices corresponding to two different bodies, the second device being a device 310. The declutching system 220 is comparable to the declutching system of the embodiment shown in FIGS. 1 to 4, being constituted by a sliding junction member 120. In like manner, the declutching system 220 also serves to provide "lost motion".

The declutching system 220 is designed to be placed at the end of a push-pull control cable 60. The end of the push-pull cable 60 is fastened to a drive bar 222, extending perpendicularly to the axis B of the cable.

The declutching system 220 also includes a control member 215. The control member has an oblong hole 224 that is elongate in the direction of the axis B, and through which the bar 222 passes. Thus, the bar 222 is suitable for driving the control member 215 in translation once it comes into abutment with an end of the oblong hole 224.

A return spring 312 that operates in compression is located between a first end 217 of the control member 215 and a support 360 secured to a stationary portion 362 of the turbomachine. This spring 312 urges the control member along the axis B in the direction that corresponds to a first direction of movement of the push-pull cable 60 (arrow C), by exerting a force on the end 217 of the control member 215.

The operation of the declutching system is thus as follows:

Over a first range of values of the actuator that acts on the push-pull control cable 60, the rod 222 is in abutment against an end of the oblong hole 224 and the spring 312 is compressed. The movements of the control member 215 are thus identical to those of the rod 222.

Over a second range of values of the actuator, once the spring 312 is extended and has reached its maximum extension, it no longer performs any function. The rod 222 can move further under thrust from the push-pull cable 60, but without the control member 215 moving. This second range of values for the actuation parameter thus constitutes lost motion for the second controlled device 310.

The control member 215 does not act directly on the second controlled device 310. The second end 219 of the control member 215, opposite from its first end 217, is connected in hinged manner to one end 232 of a lever 230. The other end 234 of the lever 230 is connected in hinged manner to the controlled device 310. The lever 230 thus serves to scale the movement of the control member 215 with a coefficient that may be greater than, equal to, or less than one; or indeed it makes it possible to change the direction of actuation.

Figure 7:
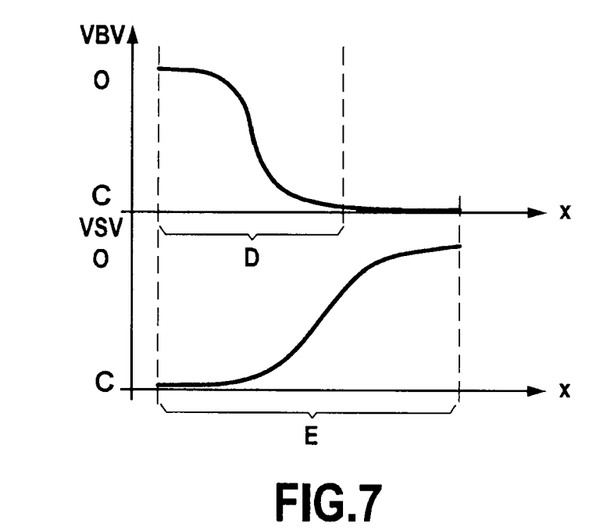
FIG. 7 is a graph showing the actions on the devices controlled by a control system of the invention that incorporates the declutching device shown in FIG. 6.

FIG. 7 shows in more theoretical manner how two devices are controlled by a control system including a declutching device such as the device 220 shown in FIG. 6.

This figure refers to the situation in which the first controlled device is a stage of variable-pitch stator vanes VSV, and where the second device is a set of variable air-bleed valves VBV.

Variations in the actuator parameter are plotted along the abscissa axis x, i.e. this axis shows the greater or smaller extent to which the actuator 24 is extended. This parameter x varies between an initial position that corresponds to the turbomachine idling or running slowly, and a final position that corresponds to the turbomachine running at high speed.

The ordinate axis corresponds to the pitch angles of the variable stator vanes VSV and to the opening angles of the variable bleed valves VBV. For each of these two devices, these angles can vary between two positions marked O for "open" and C for "closed".

The control relationship for the vane stage VSV is represented by the lower curve. It shows that the vanes are opened progressively over an actuation range E. Depending on the arrangement of the control system, opening may take place more or less suddenly, as represented by this curve having a slope that is more or less steep.

The control relationship for the air-bleed valves VBV is represented by the upper curve. The air-bleed valves VBV close progressively as the actuation parameter x increases (as the actuator 24 extends), within a corresponding actuation range D.

As can be seen in FIG. 7, in the range for closing the air-bleed valves VBV, which corresponds to relatively slow speeds of the turbomachine, the variable-pitch vanes VSV remain substantially closed; it is not until the air-bleed valves VBV are mostly closed that the variable-pitch vanes VSV begin to open.

Similarly, once the air-bleed valves VBV are largely closed, the variable-pitch vanes VSV begin to open. It can thus be understood that fine control both over the position of the variable-pitch vanes and over the air-bleed valves can be achieved using a single actuator as included in the control system of the invention.

The declutching device 120 shown in FIGS. 1 to 5 presents lost motion at the beginning of the range of variation of the actuation parameter.

In contrast, in the declutching device 220 used in the control system to which FIG. 7 refers, the lost motion is situated at the end of the range over which the actuation parameter varies (for large abscissa values x).

The control system is arranged to close the air-bleed valves VBV in such a manner that the vanes VSV begin to open while the valves VBV are closing (i.e. such that the vanes VSV begin to open and open partially to an opening well below 50%, e.g. less than 20%). This arrangement is facilitated by an actuation scaling device, which enables complete closure of the valves VBV to be obtained over an actuation range H that is nevertheless of small amplitude. By using an appropriate scaling device, it is thus possible to control the variable-geometry device 310 over a small actuation range, e.g. occupying 20% or 10% or even 5% of the total actuation range of the actuator used.

Thereafter, the air-bleed valves VBV are closed or at least substantially closed, and the control system is suitable for achieving and serves to achieve the major fraction of the closure of the vanes of the stage of variable-pitch vanes. Thus when the valves VBV are closed and are thus no longer being actuated by the actuator, the actuator remains fully operational to act on and adjust the other device, i.e. the vanes of the variable-pitch vane stage.

The invention claimed is:

1. A control system for controlling at least first and second variable-geometry devices in a turbomachine, the system comprising:
   an actuator that actuates the first and second devices;
   the first device including at least one stage of variable-pitch stator vanes and the second device constituting an air-bleed valve for a body of the turbomachine;
   the control system configured to control progressive opening of the vane stage and progressive closing of the air-bleed valves as an actuation parameter of the actuator increases.

2. A control system according to claim 1, configured to close air feed valves such that the variable-pitch stator vanes begin to open during closure of the air-bleed valves, with progressive increase of an actuation parameter of the actuator.

3. A control system according to claim 2, wherein, when the air feed valve is substantially closed, the control system is configured to perform a major fraction of closure of the vanes of a stage of variable-pitch stator vanes.

4. A control system according to claim 1, wherein the vane stage includes of a plurality of vanes, each mounted to pivot on a casing of the turbomachine, and a control ring surrounding the casing and connected to each of the vanes of the stage via respective levers, the actuator configured to cause the control ring of the stage to turn by a driver member that is pivotally mounted on the casing.

5. A control system according to claim 1, wherein the actuator includes a movable control member with movement thereof transmitting commands to the first and second devices.

6. A control system according to claim 1, wherein the actuator is configured to actuate the first device by varying a parameter over an actuation range for the first device outside which it cannot act on the first device, the actuator being arranged to actuate the second device by causing the same parameter to vary over an actuation range for the second device, outside which it cannot act on the second device, at least a fraction of the first device actuation range lying outside the second device actuation range.

7. A control system according to claim 6, wherein a second device actuation range is included within the first device actuation range.

8. A control system according to claim 1, wherein the connection between the actuator and one of the first and second devices includes a declutching device configured to declutch the drive of the device by the actuator over a range of values of an actuation parameter of the actuator.

9. A control system according to claim 8, wherein the declutching device comprises a first control member that is movable in an empty space of a second control member, the empty space providing lost motion for the second device.

10. A control system according to claim 9, further comprising return means that maintain a control member of one of the first and second devices in a predetermined position, at least when an actuation parameter varies over a range situated outside an actuation range of the one of the first and second device.

11. A control system according to claim 1, further comprising an actuation scaling device arranged in the connection between the actuator and one of the devices.

12. A control system according to claim 11, wherein the actuation scaling device comprises a follower member pivotally mounted on the casing, and an additional pivoting member interposed between the follower member and the device comprising the vane stage, to transmit the control from the actuator to the device, the additional pivoting member being mounted to pivot both on the casing and on the follower member.

13. A turbomachine including a control system according to claim 1.

* * * * *